United States Patent
Petroff

[15] 3,690,782
[45] Sept. 12, 1972

[54] LEAD-SCREW TAPPING HEAD

[72] Inventor: Robert J. Petroff, 1703 S. Main Street, Lombard, Ill. 60148

[22] Filed: June 27, 1969

[21] Appl. No.: 837,093

[52] U.S. Cl. ............408/132, 10/129 R, 10/139 CN, 408/137, 408/140
[51] Int. Cl. ..........................B23g 1/00, B23g 1/04
[58] Field of Search...............10/105, 129, 135, 139; 77/32.7, 33.3, 34.7; 408/132, 137, 140; 188/135

[56] References Cited

UNITED STATES PATENTS

| | | | |
|---|---|---|---|
| 2,500,540 | 3/1950 | Graves | 10/139 |
| 2,869,153 | 1/1959 | Capek et al | 10/135 |
| 3,013,285 | 12/1961 | Arengo | 10/139 |
| 3,134,996 | 6/1964 | Retz | 10/139 |
| 3,178,740 | 4/1965 | Dorak | 10/139 |
| 3,389,413 | 6/1968 | Van Den Kieboom | 10/139 |
| 1,159,663 | 11/1915 | Guillery | 188/135 |
| 1,530,819 | 3/1925 | Ensign | 408/140 |
| 2,257,364 | 9/1941 | Bakewell | 408/140 |
| 2,380,387 | 7/1945 | Allen | 408/140 |
| 2,718,017 | 9/1955 | Anderson et al. | 408/140 |
| 2,759,580 | 8/1956 | Bower | 408/140 |

Primary Examiner—Richard J. Herbst
Assistant Examiner—E. M. Combs
Attorney—Fitch, Even, Tabin & Leudeka

[57] ABSTRACT

Lead screw tapping apparatus for guiding and feeding a threading tool into a workpiece. The apparatus comprises an axially movable quill within which is rotatably mounted a spindle holding the threading tool. The quill is rapidly advanced and retracted from the proximity of the workpiece by means of supplied superatmospheric gas pressure acting on a piston fixedly mounted on the quill. The rapid advancement of the quill engages a clutch element, attached to a lead screw, with a corresponding clutch element rotated by a drive means, thereby advancing an associated lead nut having threads of the same pitch of the threads formed by the tool, while simultaneously rotating the spindle and threading tool. The quill (to which the lead nut is secured) the spindle and the threading tool are advanced at the same rate, the tool thus forming the threads in the workpiece. Obstacles or forces encountered during the threading operation which are greater in magnitude than the total resultant force produced by the preselected gas pressure acting on the piston disengage the clutch surfaces thereby stopping the operation and saving the threading tool from destruction.

4 Claims, 10 Drawing Figures

INVENTOR
ROBERT J. PETROFF

ATTYS.

INVENTOR
ROBERT J. PETROFF

LEAD-SCREW THREADING HEAD

The present invention relates generally to tapping apparatus. More particularly, it relates to tapping apparatus in which a lead screw regulates and controls the progress of the tap.

As is well known, the operation of tapping involves providing internal threads in a workpiece so that the work piece may be joined to an externally threaded screw, bolt or stud. A hole is drilled in the workpiece to a depth slightly greater than the desired length of the internal threads, and to a diameter slightly less than the desired minor diameter of the internal threads. Thereafter, a tap is inserted into the hole, the tap having a number of cutting teeth on its periphery which correspond to the diameter, pitch, thread series, class of fit and hand of the desired internal threads. The tap is rotated in the direction of the desired hand and as it is rotated it cuts threads in the drilled hole progressively deeper until the desired length of threads is obtained. The tap is then rotated in the opposite direction to withdraw it from the tapped hole. There is thereby provided the desired tapped hole.

In some applications, the progress of the tap into the hole is controlled by the tap itself, i.e., as the cutting teeth of the tap engage the inside of the drilled hole and begin cutting of the internal threads the tap is advanced progressively deeper into the hole by the threads as they are formed. This method of tap advance is not always the most effective or efficient, and in most modern high-speed machining operations the progress of the tap into the hole is controlled by a lead screw. In lead screw tapping apparatus, the tap is mounted on the end of a spindle and the spindle is in turn secured within an externally threaded sleeve called the lead screw. The pitch of the threads on the lead screw is the same as the desired pitch of the tap. The lead screw in turn is received in a fixed internally threaded collar or nut, so that rotation of the spindle and threaded lead screw inside the stationary nut causes the lead screw and the spindle to advance or retract axially at the same rate as that desired in the tapped hole. This type of tapping operation provides more precise and accurate threading, and is best adapted for modern high-speed precision machining operations.

Various types of lead screw tapping heads have been commercially manufactured for carrying out tapping processes. Such heads usually comprise a spindle for holding the tap, the spindle being secured in the lead screw, and drive means connected to the spindle for rotation of the lead screw inside the nut to effect advancing of the tap into the drilled hole. Early models of such tapping heads were manually controlled, that is, an operator positioned the spindle so that the tap was adjacent the drilled hole, then started the drive means and permitted the tap to advance into the hole to the desired depth. The operator thereupon reversed the direction of rotation of the spindle and tap for removal of the tap from the hole. Later models of lead screw tapping heads utilized automatic or semi-automatic operation in that the tap was positioned, advanced, stopped, and reversed by automatic or semi-automatic switches or the like. The automatic or semi-automatic tapping heads are particularly adaptable for use in automated production and assembly lines, wherein the workpiece is brought successively to various stations, at each of which stations a particular machining operation is effected. For example, a workpiece in which internal threads are to be tapped may be brought to a first station at which a drill is automatically or semi-automatically brought up to the workpiece and then is advanced into the workpiece to the desired depth, following which the drill is retracted. The workpiece is then conducted to a succeeding station at which the tapping head is positioned. Upon being secured in the succeeding station, the spindle of the tapping head is advanced up to the drilled hole, and is then rotated and advanced into the hole up to the desired depth of threads. The tap is then rotated in the opposite direction and withdrawn from the workpiece. Following this sequence of operations, the workpiece may be moved to other stations for further machining operations, or it may be discharged from the machine.

A serious problem which is frequently encountered with tapping heads presently available occurs when, instead of a workpiece with a drilled hole being presented to the tapping head, the workpiece for some reason or other does not have a drilled hole, i.e., the workpiece is "blind." In this situation, when the tap is advanced to the workpiece the tap cannot advance into the workpiece. Nevertheless, the spindle continues to be advanced by the lead screw, and the drive train between the motor and the spindle ordinarily includes a large gear reduction from the motor speed to the spindle speed which gives the motor a large mechanical advantage. Moreover, the drive train is a direct drive so that a very large axial force is exerted on the workpiece by the tap. The result usually is that either the tap is damaged or destroyed, or the workpiece is forced out of position causing stoppage of the indexing mechanism. A similar problem is created when, although a hole has been drilled in the workpiece, it has not been drilled to a sufficient depth to accommodate the length of tap being advanced. In this situation, when the tap "bottoms" in the hole not only is its forward movement arrested but so also is its rotation, and the tap is almost invariably destroyed. A similar situation may occur when the drilled hole is adjacent to a void or crack in the workpiece. The tap in such situations may grab and be twisted off by the spindle.

It is the primary object of the present invention to provide a lead screw tapping head in which one or more of the foregoing disadvantages are overcome. Other objects and advantages will become apparent from the following description and from the drawing in which:

Figure 1:
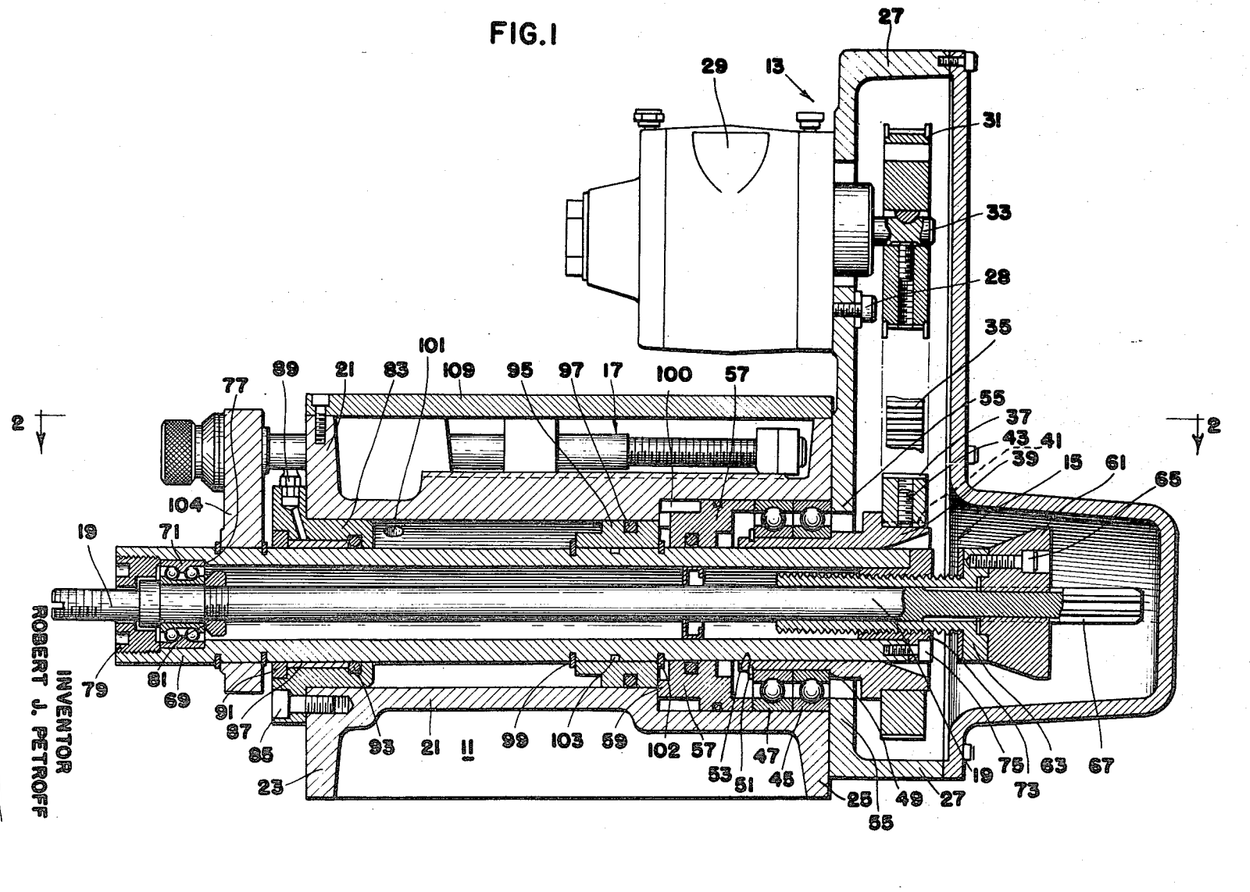
FIG. 1 is an elevational cross-sectional view of one embodiment of a lead screw tapping head chosen to illustrate the features of the present invention, shown with the spindle in its fully retracted position.

Generally, and with reference to FIG. 1 of the drawing, there is provided in accordance with the present invention a lead screw tapping head 11 comprising drive means 13, clutch means 15, and control means 17 which cooperatively enable a spindle 19 carrying a tap at its end to be rapidly advanced up to a workpiece, driven under controlled limited force to tap internal threads in the workpiece to a desired depth, thence retracted from the work piece until the tap clears the workpiece, and thence rapidly retracted to the starting position. At all times while the spindle and tap are rotating the axial and rotational forces available at the tap is limited to a pre-selected maximum, so that the tap is protected against damage and destruction. Axial movement of the spindle 19 and tap and rotational movement of the spindle and tap are automatically controlled by the pneumatic control system of FIG. 8 and the electrical control system of FIG. 9 acting in cooperation with each other.

Figure 2:
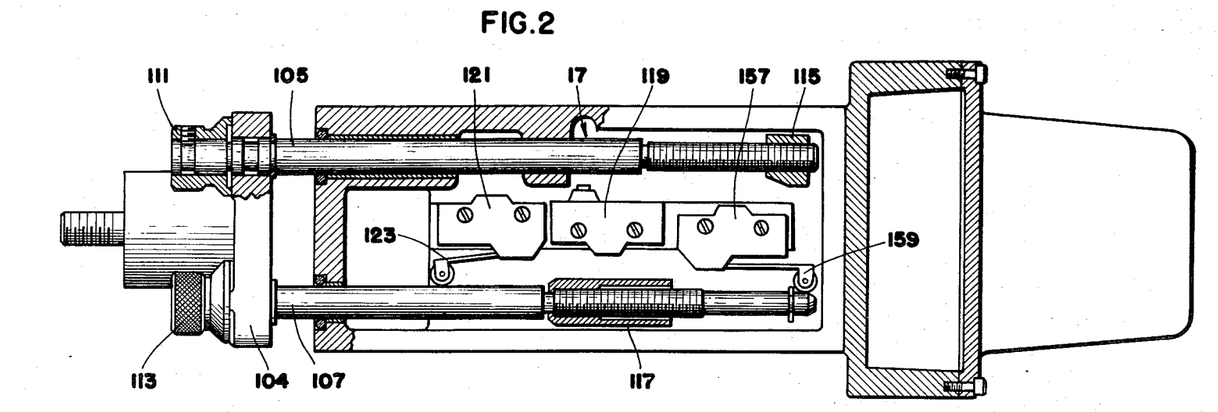
FIG. 2 is a cross-sectional view of the lead screw tapping head of FIG. 1 taken along lines 2—2 of FIG. 1.

More particularly, and with particular reference to FIGS. 1 and 2 of the drawing, the embodiment chosen to illustrate the principles of the present invention includes drive means 13 comprising a body housing 21 which supports or partly encloses clutch means 15, control means 17 and the spindle 19 on legs 23 and 25. Secured to one end of the body housing 21 is a drive housing 27 which supports and partly encloses the drive means 13.

The drive means 13 includes a pneumatic motor 29 secured to the drive housing 27, as by machine screws 28. The motor 29 is reversible by reversing the flow of air through it, as will subsequently be more particularly described. It should be understood, however, that other types of motors such as electric motors may also be used, provided that such other types are also reversible.

The drive means 13 further includes a drive pulley 31 secured to the drive shaft 33 of the motor 29. A belt 35 is trained around the drive pulley 31 and also around the driven pulley 37 of the clutch means 15, next to be described.

The driven pulley 37 is secured to a clutch cup 39 by means of a key 41 held in position by a set screw 43. The clutch cup is rotatably supported inside the body housing 21 by bearings 45 and 47. Relative axial movement of the clutch cup 39 with respect to the bearings 45 and 47 is prevented by a shoulder 49 of the clutch cup which bears against the inner race of the bearing 45 and by a retaining ring 51 received in a peripheral groove 53 of the clutch cup which bears against the inner race of bearing 47. Relative axial movement of the bearings 45 and 47 with respect to the body housing 21 is prevented by an overhanging lip 55 of the drive housing 27 which bears against the outer race of bearing 45 and by a quill end cap 57 which bears against the outer race of the bearing 47 and which is secured against axial movement by an interior shoulder 59 of the body housing 21.

Thus, with respect to the elements of the lead screw tapping head 11 which have so far been particularly described, it will be seen that the drive means 13 permits the clutch cup 39 to be rotated in either direction, with the clutch cup 39 prevented from moving axially with respect to the body housing 21.

The clutch means 15 further includes a clutch cone 61 to which is secured the lead screw 63, as by machine screws 65. Both the clutch cone 61 and the lead screw 63 are mounted concentrically about the spindle 19. Relative rotational movement of the clutch cone 61 and the lead screw 63 with respect to the spindle 19 is prevented by splines 67 on the rearward end of the spindle which are received in the interior grooves of the clutch cone 61. However, the clearance between the clutch cone 61 and the lead screw 63 and the spindle 19 are sufficient so that the spindle 19 is free to move axially with respect to the clutch cone 61 and the lead screw 63.

The spindle is rotatably mounted within a hollow shaft or quill 69 by a bearing 71 adjacent the forward end of the quill 69 and by the lead nut 73 adjacent the rearward end of the quill 69. The lead nut 73 is secured to the quill by machine screws 75 or the like, from which it can be seen that there can be no relative motion between the lead nut and the quill either rotationally or axially. The lead screw 63 is, of course, threadably received in the internal threads of the lead nut 73.

Axial movement of the bearing 71 with respect to the quill 69 is prevented by an interior shoulder 77 of the quill against which the outer ring of the bearing 71 bears, and by an end bearing cap 79 which is threadably received in the forward end of the quill 69 and which bears against the other side of the outer race of the bearing 71. The bearing 71 is a thrust bearing, and axial stresses between the spindle 19 and the quill 69 are carried by this bearing. The inner race of the bearing 71 is secured to the spindle 19 by a lock nut 81.

The quill 69 which, as previously described carries within it the spindle 19, is received in the body housing 21 in a manner which permits the quill to move axially with respect to the body housing 21. To this end, the quill 69 is received within a quill nose cap 83 which is secured to the forward end of the body housing 21 by machine screws 85 or the like. A bushing 87 is provided between the quill nose cap 83 and the quill 19, to which lubricant may be provided through an oiler 89. An oil seal 91 is provided at the forward end of the bushing 87, and an O-ring 93 is provided at the rearward end of the bushing 87 to confirm the lubricant. The clearance between the quill nose cap 83 and the bushing 87 and the quill 69 is sufficient to permit the quill 69 to move freely axially with respect to the body housing 21. Similarly, the clearance between the end cap 57 and the quill 69 is sufficient to permit the quill 69 to move freely in an axial direction.

The quill 69, together with the spindle 19 carried within it and the lead screw 63, lead nut 73 and clutch cone 61 associated therewith, are all movable axially as a unit to rapidly position the tap (not illustrated in FIGS. 1 or 2) carried on the end of the spindle in close proximity to the workpiece, and thereafter to permit the tap to advance into the previously prepared drilled hole to the desired depth. These elements are thereafter movable axially as the tap is backed out of the tapped hole and, as the tap clears the workpiece, to rapidly retract to its starting position. The manner in which such axial movement is effected will next be described.

It will be seen that there is an annular space between the quill 69 and the interior of the body housing 21 which is enclosed at one end by the quill nose cap 83 and at the other end by the quill end cap 57. This annular space is utilized as the cylinder in which a piston 95 is caused to move either forwardly or rearwardly by the admission of compressed air on one side of the piston or the other. More particularly, the piston 95 comprises an annular member in which is received an O-ring 97. The O-ring 97 provides a relatively fluid-tight seal between the piston 95 and the inner wall of the body housing 21. The piston 95 is secured axially to the quill 69 by retaining rings 99 and 102 which are positioned at either end of the piston and are received in peripheral grooves in the quill 69. Another O-ring 103 is provided between the piston 95 and the quill 69 which provides a relatively fluid-tight seal between the piston and the quill.

A quill advancement inlet port 100 is provided through which compressed air may be admitted to the rearward side of the piston 95 to cause the piston 95, the quill 69 and the spindle 19 and its associated elements to advance forwardly toward the workpiece. A quill retraction inlet port 101 is provided in the body housing 21 through which compressed air may be introduced to cause the piston 95, quill 69 and spindle 19 and its associated elements to retract rearwardly from the workpiece. As will subsequently be more particularly described, each inlet port also functions as an exhaust port.

Starting from the position shown in FIG. 1, the piston 95, quill 69, spindle 19 and its associated elements are caused to advance rapidly upon admission of compressed air through the quill advancement inlet port 100 until the clutch cone 61 engages the clutch cup member 39, whereupon the surfaces of the clutch cone and clutch cup engage each other so that further forward movement of the clutch cone 61 and the lead screw 63 is prevented. As will be subsequently described, the distance of the clutch cone 61 from the clutch cup member 39 in the fully retracted position determines the distance through which the quill and the spindle 19 advance rapidly toward the work piece. When the clutch cone is engaged by the clutch cup, the tap on the forward end of the spindle is in close proximity to the workpiece. From this position of the tap, the tap is advanced by rotation of the spindle 19 and lead screw 63 with respect to the lead nut 73, which results in advancement of the tap, spindle and quill in timed relation to the advancement of the tap into the drill hole.

More particularly, at the beginning of the sequence of operations the pneumatic motor 29 is energized so that the driven pulley 37 is rotating in the proper direction for tapping. However, until the clutch means 15 is engaged, the clutch cup 39 merely idles. However, as soon as the rapid advance portion of the sequence is completed so that the clutch means 15 is engaged, the drive means 13 also causes the clutch cone 61 and the lead screw 63 which is secured to the clutch cone to rotate in the direction for tapping. Upon commencement of rotation of the lead screw 63, the lead nut 73 is caused to advance along the lead screw 63 and thereby cause the quill and spindle to advance forwardly into the workpiece. Rotation of the clutch cone 61 also results in rotation of the spindle 19 so that as the quill 69 and the spindle 19 advance, the spindle 19 is also rotating, and the tap attached to the end of the spindle enters the drill hole of the workpiece and effects tapping of the hole. This set of conditions is maintained until the tap has completed the desired length of threads in the drill hole.

Upon reaching the point of maximum advance, i.e., where the tap has completed the desired length of threads, the direction of rotation of the pneumatic motor 29 is reversed, so that the spindle 19 and the tap attached thereto together with the quill 69 "back out" of the tapped hole in the same manner as that described for the tapping operation except in reverse. When the tap clears the workpiece, the spindle 19 and quill 69 are rapidly retracted to the beginning position by admitting compressed air to the other side of the piston 95 through the quill retraction inlet port 101 and permitting the compressed air on the other side of the piston to be exhausted through the quill advancement inlet port 100. This disengages the clutch surfaces and returns the quill 69, spindle 19, clutch cone 61, and lead screw 63 to the beginning, fully retracted position illustrated in FIG. 1. It will be seen that the distance between the clutch cone 61 and the clutch cup 93 in the fully retracted position is a function of the position during retraction of the tap where compressed air is admitted to rapidly retract the quill, i.e., the point at which the clutch surfaces are disengaged.

An important feature of the present invention resides in the manner in which the clutch surfaces of the clutch cone 61 and the clutch cup 39 are held in contact. It will be remembered that the clutch surfaces are brought into engagement by admitting compressed air through the quill advancement inlet port 100 to thereby rapidly advance the quill and spindle until the clutch surfaces are engaged. The force exerted by the clutch cone 61 against the clutch cup 39 is determined by the cross-sectional area of the piston 95 and the pressure of the compressed air. By utilizing higher air pressure, the force is increased, and by using lower pressure the force is decreased. Because the friction between the clutch surfaces is proportional to this force, there is provided a means whereby the torque transmitted to the tap may be limited to a preselected value.

To illustrate this torque-limitation feature, assume that the drilled hole in the work piece is mistakenly too shallow so that the tap "bottoms" before the quill and spindle reach their maximum advance. As previously described, in prior art lead screw tapping heads this would almost invariably result in destruction of the tap because of the high torque which would have been available at the tap. However, in accordance with the present invention, such undesired result does not occur. The pressure of the compressed air forcing the clutch surfaces together is selected so that at a predetermined torque, less than the torque which would result in failure of the tap, the clutch surfaces slip so that the tap is not subjected to torque which would result in its destruction. Similarly, if the tap should engage a void and seize or grab, only a preselected maximum torque is available at the tap before slippage occurs, so that destructive stress is avoided.

If the workpiece does not have a drilled hole, i.e., if it is "blind," the tap is prevented from forward movement, although it is not prevented from rotating. Nevertheless, in prior art lead screw tapping heads the mechanical advantage has been such that the work piece is pushed out of position, or the tap may be destroyed, by the axial force exerted on the work piece and top. However, in accordance with the present invention, when the tap comes up against a blind workpiece, the axial force available at the tap can only build up to a preselected value at which that force exceeds the force holding the clutch faces in engagement, and thereupon the clutch members become disengaged so that the tap is not subjected to destructive force. AS previously indicated, the stress limiting features of the present invention provide valuable benefits.

Continuing with the description of the lead screw tapping head 11, and with particular reference to FIG. 2 of the drawing in which the control means 17 is more particularly illustrated, a torque arm 104 is secured to the quill 69 and extends upwardly therefrom. Two openings are provided in the torque arm 104, through which extend a stop adjustment screw 105 and a rapid advance-rapid retraction adjustment screw 107. The adjustment screws 105 and 107 extend through openings in the body housing 21 and into a region of the body housing 21 which is enclosed by a switch cover 109. Knobs 111 and 113 are provided on the outside of the torque arm 104 which permit the adjustment screws to be turned to thereby position a stop collar 115 on the stop adjustment screw and a rapid advance-rapid retraction actuator 117 on the rapid advance adjustment screw. A stop switch 119 is secured to the body housing 21, whereas the stop collar 115 is movable with and along the stop adjustment screw 105. A rapid advance-rapid retraction switch 121 is also provided which is similarly attached to the body housing 21, and which is actuated by the rapid advance-rapid retraction actuator 117. The cooperative operations of these parts of the control system will next be described.

Figure 3:
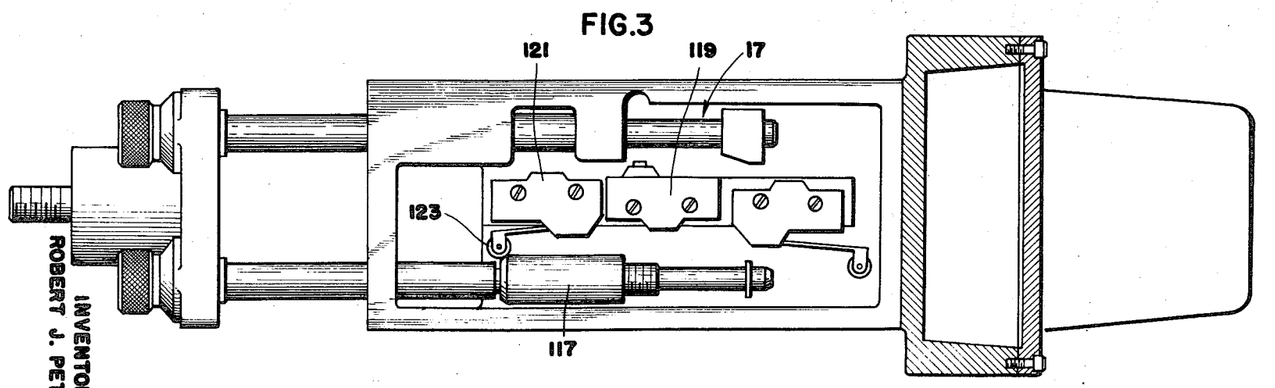
FIG. 3 is a plan view of the lead screw tapping head of FIG. 1 showing the tap and spindle advanced to a position adjacent the workpiece.

FIG. 3 illustrates the control system 17 at the end of the rapid advance portion of the operating sequence, and is also illustrative of the control system at the beginning of the rapid retraction portion of the operating sequence. It will be seen that at this point the follower 123 of the rapid advance-rapid retraction switch 121 is about half way up the beveled end of the rapid advance-rapid retraction actuator 117, at which position the contacts of the rapid advance-rapid retraction switch 121 are closing at the end of the rapid advance portion of the operating sequence, and are opening at the beginning of the rapid retraction portion of the operating sequence. The effect of closing and opening of this switch will subsequently be described.

Figure 4:
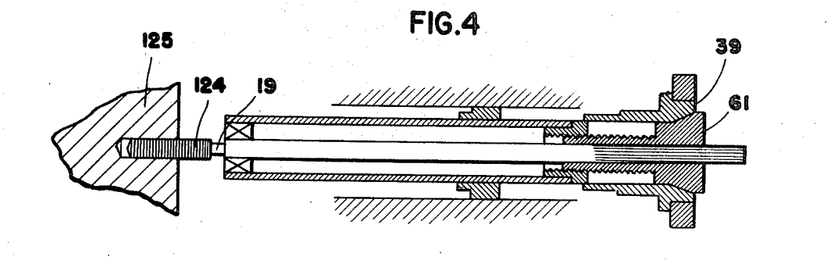
FIG. 4 is a simplified cross-sectional elevational view of the lead screw tapping head of FIG. 1 showing the tap and spindle fully advanced to the desired depth of the internal threads in the workpiece.
Figure 5:
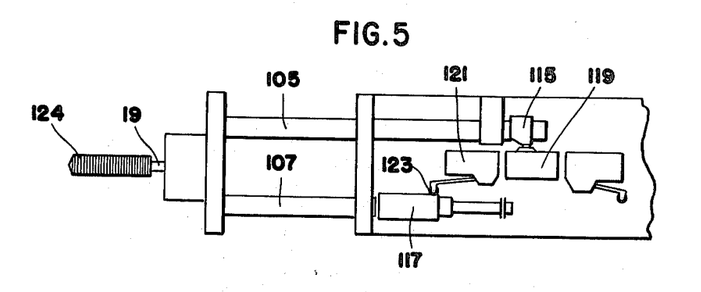
FIG. 5 is a simplified cross-sectional plan view of the lead screw tapping head in the position of FIG. 4.

Next referring to FIGS. 4 and 5, which are simplified views of the lead screw tapping head 11 of the present invention at its position of maximum advance, it will be seen from FIG. 5 that in this position, with tap 124 at its maximum depth in the workpiece 125, the button of the stop switch 119 is depressed by the collar 115, thereby closing the stop switch 119 (FIG. 5). Closure of the stop switch 119 results in reversal of the pneumatic motor 29, in a manner which will be described subsequently.

Figure 6:
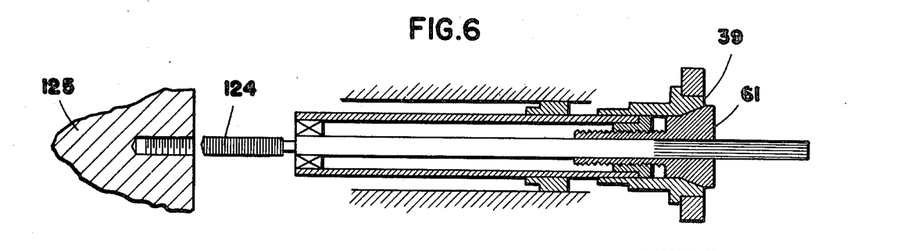
FIG. 6 is a simplified cross-sectional elevational view of the lead screw tapping head with the tap and spindle backed out of the tapped hole and in position for rapid retraction to the starting position.

Reversal of the motor 29 causes the direction of rotation of the spindle 19 and tap 124 to be reversed, so that the tap is backed out of the tapped hole. When the tap 124 clears the work piece, as illustrated in FIG. 6, the follower 123 of the rapid advance-rapid retraction switch 121 has dropped about halfway down the shoulder of the rapid advance-rapid retraction actuator 117, returning the switch 121 to its open position. This results in the admission of compressed air into the opposite side of the piston 95 through the retraction inlet port 101, so that the clutch cone 61 is disengaged from the clutch cup 39 of the clutch means 15 and the quill and spindle are rapidly retracted to their fully retracted positions. The particular manner in which this is accomplished will also be described subsequently.

Figure 8:
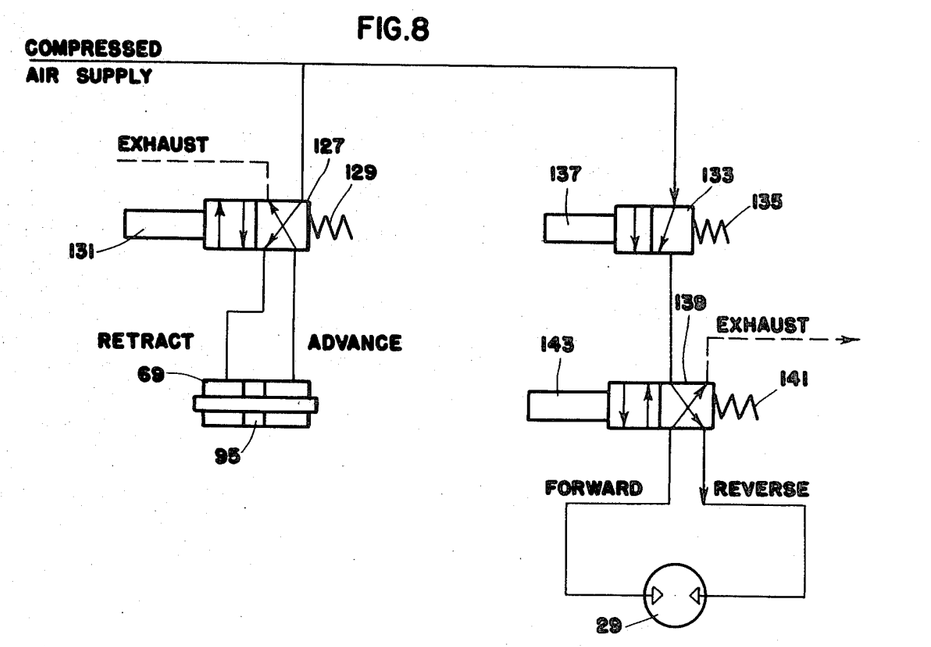
FIG. 8 is a schematic diagram of the pneumatic control system of the lead screw tapping head.

FIG. 8 illustrated the pneumatic control system of the illustrated lead screw tapping head. A compressed air supply (not illustrated) provides compressed air to a four-way rapid advance-rapid retraction valve 127 which controls the flow of compressed air to either side of the piston 95. The four-way rapid advance-rapid retraction valve 127 is spring-biased in the position shown by spring means 129, so that its illustrated normal position results in admission of compressed air through the retraction inlet port 101, thereby keeping the piston 95 and quill 69 in the fully retracted position. The four-way rapid advance-rapid retraction valve 127 is movable to its second position by energization of a solenoid 131, which moves the valve against the biasing force of the spring 129 to a position in which compressed air is admitted to the advancement inlet port 100. This admits compressed air to the rearward side of the piston 95, so that the piston and quill 69 are rapidly moved forward toward the workpiece.

The pneumatic control system further includes a motor supply valve 133 which is spring-biased in the position shown by spring means 135. Thus, in its illustrated normal position, the motor supply valve 133 is closed, so that compressed air does not pass through the valve. The motor supply valve 133 may, however, be opened by energization of a solenoid 137 which moves the valve against the bias of the spring 135 to permit compressed air to be supplied to the motor 29.

The direction of flow of compressed air to the motor 29 is controlled by a four-way motor direction valve 139. In its illustrated normal position, the valve 139 is spring-biased in the illustrated position by spring means 141, in which position compressed air is supplied to the motor 29 so as to cause the motor to rotate in the direction opposite to the hand of the tap, sometimes referred to herein as the reverse direction. The valve 139 may be moved to its second position by energization of a solenoid 143, which operates against the bias of the spring 141 to change the direction of flow of compressed air to the motor 29 to thereby cause it to rotate in the same direction as the hand of the tap, sometimes referred to herein as the forward direction.

Figure 9:
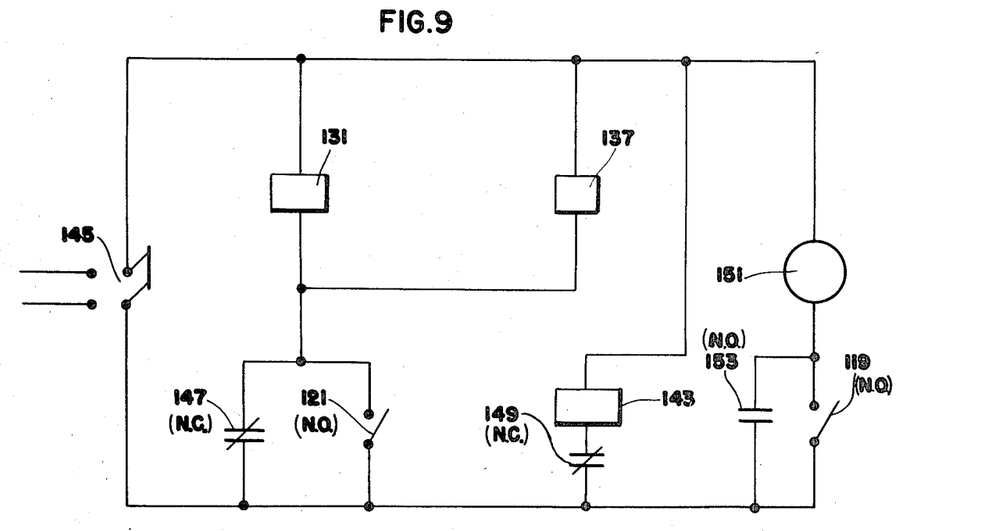
FIG. 9 is a schematic diagram of the electrical control system of the lead screw tapping head.

FIG. 9 illustrates the electrical control system by which the pneumatic control system is energized. It includes a main switch 145 connected to a source of current on the line side and to the electrical control circuit on the load side. Included in the circuit are the solenoids 131, 137 and 143, which, as illustrated in FIG. 8, are operatively associated with the four-way rapid advance-rapid retraction valve 127, the motor supply valve 133 and the four-way motor direction valve 139, respectively. Flow of current to the four-way rapid advance-rapid retraction solenoid 131 and to the motor direction solenoid 137 is controlled by two switches wired in parallel. One of the switches is the rapid advance-rapid retraction switch 121 first described in connection with FIG. 2. As previously described, switch 121 is open at the beginning of the operating sequence, and it therefore is denoted as a normally open (N.O.) switch. The switch 147 in parallel with switch 121 is a relay operated switch which is normally closed (N.C.).

Flow of current to the motor direction solenoid 143 is controlled by relay switch 149 which is normally closed.

A relay 151 is provided which operates relay switches 147 and 149, as well as another relay switch 153 yet to be described. The relay 151 is energized by either of two switches wired in parallel. The first switch is the stop switch 119 first described in connection with FIG. 2 which is open at the beginning of the operating sequence of the lead screw tapping head, and is therefore denoted normally open. The other switch 153 is a relay-operated switch which is normally open, and which "locks in" the relay 151 when it is closed.

Having thus described the pneumatic control system and the electrical control system, the entire operating sequence of the lead screw tapping head 11 with respect to these control systems will be described. At the beginning of the operating sequence, the lead screw tapping head and its associated switches are in the positions illustrated in FIGS. 1 and 2, in which positions the stop switch 119 and the rapid advance-rapid retraction switch 121 are in their open positions. Referring to the electrical control system illustrated in FIG. 9, with the main switch 145 open, it will be seen that relay switches 147 and 149 are closed, and all other switches are open. Upon closing the main switch 145 (which may be accomplished either manually or in response to an automatic signal) the solenoids 131, 137 and 143 are all energized. Referring to FIG. 8, this means that the four-way rapid advance-rapid retraction valve 127 is moved against the bias of the spring means 129 to a position in which compressed air is admitted to the rearward side of the piston 95 and the piston and quill 69 are rapidly advanced toward the workpiece. At the same time, the motor supply valve 133 is opened so that compressed air may flow through it, and the motor direction valve 139 is moved against the bias of spring means 141 to a position in which the compressed air is directed to the motor so as to cause it to rotate in the direction of the hand of the tap, or in the forward direction.

Thus, upon closing of the main switch 145, the spindle 19 and quill 69 are rapidly advanced to a position adjacent the workpiece, at which position the surfaces of the clutch cup 39 and the clutch cone 61 are engaged. Simultaneously, the motor 29 is energized, causing the driven pulley 37 to rotate in a forward direction.

Thereafter, the spindle and tap are rotated and are simultaneously fed into the drill hole of the work piece by operation of the lead screw 63 and lead nut 73, thereby tapping the drilled hole.

At the same time that the clutch is engaged, the rapid advance-rapid retraction switch 121 is closed by contact of the follower 123 with the rapid advance-rapid retraction actuator 117. Closure of switch 121 does not, however, change the electrical control system circuit (FIG. 9) because relay switch 147 is also closed, and switch 121 is in parallel with switch 147.

When the tap 124 reaches its position of maximum advancement (FIG. 4), stop switch 119 is closed (FIG. 5). It will be seen from FIG. 9 that closure of switch 119 energizes the relay 151, which in turn changes the position of relay switches 147, 149 and 153. Relay switch 147 goes from its normally closed position to its open position, but this does not affect the flow of current to solenoids 131 and 137 because the rapid advance-rapid retraction switch 121 is also closed, and these switches are in parallel. However, energization of relay 151 causes relay switch 149 to move from its normally closed position to its open position, thereby de-energizing solenoid 143. It will be seen from FIG. 8 that such de-energization of solenoid 143 causes the motor direction valve 139 to be returned to its illustrated position by spring means 141, so that the direction of flow of compressed air to the motor 29 is reversed. This causes the motor 29 to immediately reverse its direction of rotation so that it begins rotating opposite to the hand of the tap, thereby causing the spindle 19 and tap 124 to back out of the tapped hole. It should be noted that while backing out, compressed air continues to be supplied to the rearward side of the piston 95, thereby keeping the clutch surfaces in engagement under controlled force.

Closing of the stop switch 119 and consequent energization of the relay 151 also causes relay switch 153 to close. Closing of relay switch 153 does not affect the relay circuit because stop switch 119 is also closed at this point. However, closing of relay switch 153 "lock in" relay 151, so that when stop switch 119 is subsequently opened, relay 151 continues to be energized.

As the motor 29 causes the tap 124 and spindle 19 to back out of the tapped hole, stop switch 119 opens as the stop collar moves away from the stop switch. However, as just indicated, because relay switch 153 is now closed, relay 151 continues to be energized.

Figure 7:
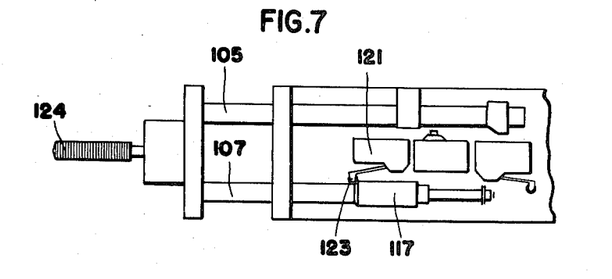
FIG. 7 is a simplified cross-sectional plan view of the lead screw tapping head in the position of FIG. 6.

When the tap 124 and spindle 19 clear the work piece (FIG. 6) the rapid advance-rapid retraction switch 121 changes from a closed condition to an open condition as the follower 123 comes off the rapid advance-rapid retraction actuator 117 (FIG. 7). From FIG. 9 it will be seen that opening of the switch 121 de-energizes solenoids 137 and 131 because both the relay switch 147 and switch 121 are then open. De-energization of solenoid 131 permits the rapid advance-rapid retraction valve to be returned by spring means 129 to its illustrated position, thereby changing the compressed air from the rearward side of the piston 95 to the forward side of the piston. This results in rapid retraction of the tap and spindle to the fully retracted position of FIGS. 1 and 2. Simultaneously, the clutch surfaces are disengaged so that the spindle and tap are no longer rotated by the motor 29. It will be seen that the point at which the rapid advance-rapid retraction switch 121 is opened, causing rapid retraction of the quill and spindle, determines the distance between the clutch cup 39 and the clutch cone 61 in the fully retracted position of FIG. 1.

Opening of the rapid advance-rapid retraction switch 121 and consequent de-energization of solenoid 137 also permits the motor supply valve 133 to be returned by spring means 135 to the position illustrated in FIG. 8, thereby cutting off the supply of compressed air to the motor 29 so that it ceases to rotate.

At this time, with all switches open except relay switch 153 and the main switch 145, the lead screw tapping head 11 is in a "hold" condition, with the motor 29 not operating and the spindle and quill held in their fully retracted position by air pressure on the forward side of the piston 95. When the lead screw tapping head 11 is in such condition, a limit switch 157 is closed by a follower 159 which engages the rearward end of the rapid advance-rapid retraction adjustment screw 107. Closing of the switch 157 provides a signal indicating completion of the operating sequence, which signal be used to trigger the beginning of another operating sequence. To begin another operating sequence, the main switch 145 is first opened, which de-energizes relay 151, and thereby permits relay switches 147 and 149 to close and relay switch 153 to open. Thereafter, closing of the main switch 145 begins the operating sequence just described.

Figure 10:
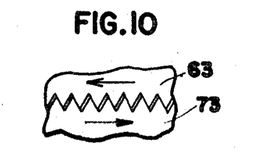
FIG. 10 is an enlarged fragmentary cross-sectional view of the threaded portions of the lead screw and lead nut of FIG. 1.

An important benefit which is enjoyed in accordance with teachings of the present invention is that wear of the lead screw 63 or lead nut 73 does not result in "-play" between the lead screw and lead nut as the tapping operation is carried out. In prior art lead screw tapping heads, compensation for wear must be provided or else the accuracy and reproduceability of feed of the tap is impaired. Such compensating devices have frequently been complicated and costly and often do not provide as accurate and reproduceable threads as when the lead screw and lead nut are new. In accordance with the present invention, no such compensating devices are required because at all times while the tap is fed into the drill hole, the threads of the lead screw and lead nut are urged toward each other, so that no play results. This is illustrated in FIG. 10, which shows an enlarged fragment of the thread portion of the lead screw 63 in engagement with the lead nut 73. At all times during the tapping operation, the air pressure on the rearward side of the piston 95 urges the quill, clutch cone 61 and lead screw 63 forwardly toward the workpiece, as indicated by the arrow. During the tapping operation, thrust is exerted on the tap and spindle so that the lead nut is urged in the opposite direction, as indicated by the arrow. Thus, it will be seen that the same surfaces of the threads are maintained in contact with each other by the tapping operation, so that no compensation for wear is necessary.

Various of the features of the present invention are set forth in the following claims.

I claim:

1. Lead screw threading apparatus for guiding and feeding a threading tool toward and into a workpiece comprising, in combination, a frame, rotatable drive means secured to said frame and including a first clutch element, a non-rotatable hollow cylindrical quill mounted for axial movement relative to said frame, a spindle rotatably mounted in said quill, a lead screw nut fixedly attached to said quill, a lead screw threadably received in said lead screw nut and keyed to said spindle as to permit the spindle to move axially relative to said lead screw during the threading operation, a second clutch element secured to said lead screw, and means for affecting unitary axial movement of said quill, said spindle, said lead screw nut, said lead screw and said second clutch element toward the workpiece to engage said first and second clutch elements and thereby place said spindle in driven relation with said drive means.

2. Apparatus in accordance with claim 1 in which said means for effecting unitary axial movement comprises a chamber surrounding at least a portion of said quill, a piston in said chamber secured to said quill, and means supplying compressed gas to said chamber at a preselected superatmospheric pressure, whereby said spindle is urged toward the workpiece with a force proportional to said preselected superatmospheric pressure, thereby establishing the maximum axial force exertable against the workpiece by a threading tool held on said spindle, and also establishing the maximum torque transmissible between said first and second clutch elements.

3. Lead screw apparatus in accordance with claim 1 in which the unitary axial movement of said quill, said spindle, said lead screw nut, said lead screw and said second clutch element is between a first position remote from the workpiece and a second position closer to the workpiece, said clutch elements being disengaged in said first position and engaged in said second position.

4. Lead screw tapping apparatus in accordance with claim 3 in which said quill, said spindle, said lead screw nut, said lead screw and said second clutch element are adapted for rapid movement between said first position and said second position.

* * * * *

UNITED STATES PATENT OFFICE
CERTIFICATE OF CORRECTION

Patent No. 3,690,782        Dated September 12, 1972

Inventor(s) Robert J. Petroff

It is certified that error appears in the above-identified patent and that said Letters Patent are hereby corrected as shown below:

Cover Page, Column 1, line 1, change title "Lead-Screw Tapping Head" to -- Lead-Screw Threading Head --

Column 3, line 26, delete "is" and substitute -- are -- line 26, delete "a" from sentence line 26, change "maximum" to -- maximums --

Column 4, line 19, before "interior" delete -- the -- line 20, "clearance" should be -- clearances -- line 56, delete "confirm" and substitute -- confine --

Column 6, line 35, delete "93" and substitute -- 39 -- line 37, delete "where" and substitute -- when --

Column 7, line 24, "AS" should be -- As --

Column 8, line 4, before "tap 124" add -- the -- line 6, before "collar 115" add -- stop --

Column 10, line 45, change "lock in" to -- locks in --

Column 11, line 26, before "be" add -- may --

Column 12, Claim 1, line 19, before "as" add -- so --

Signed and sealed this 22nd day of May 1973.

(SEAL)
Attest:

EDWARD M. FLETCHER, JR.
Attesting Officer

ROBERT GOTTSCHALK
Commissioner of Patents